UNITED STATES PATENT OFFICE.

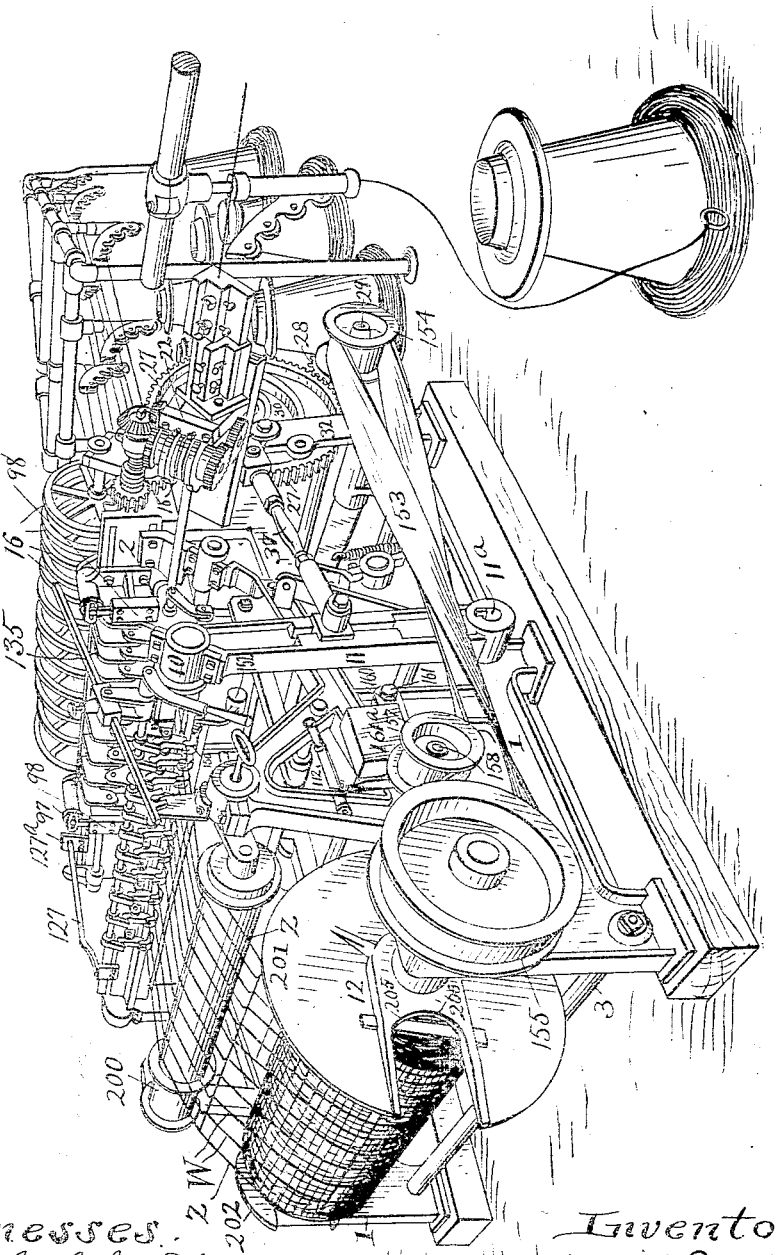

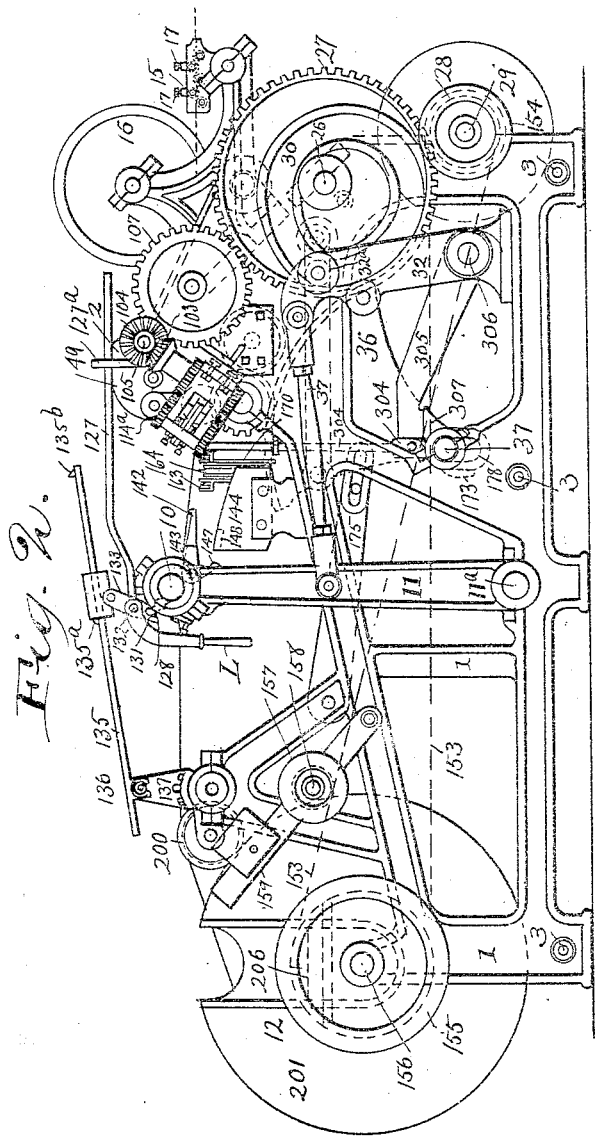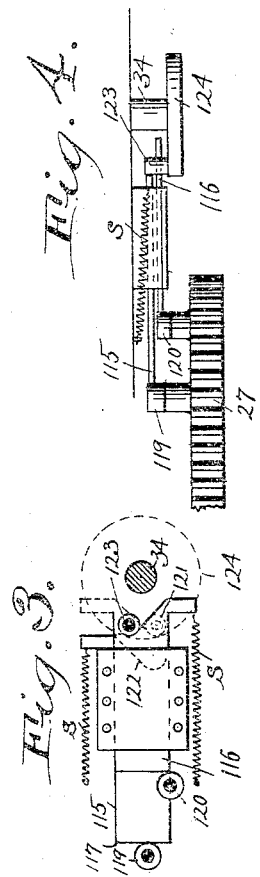

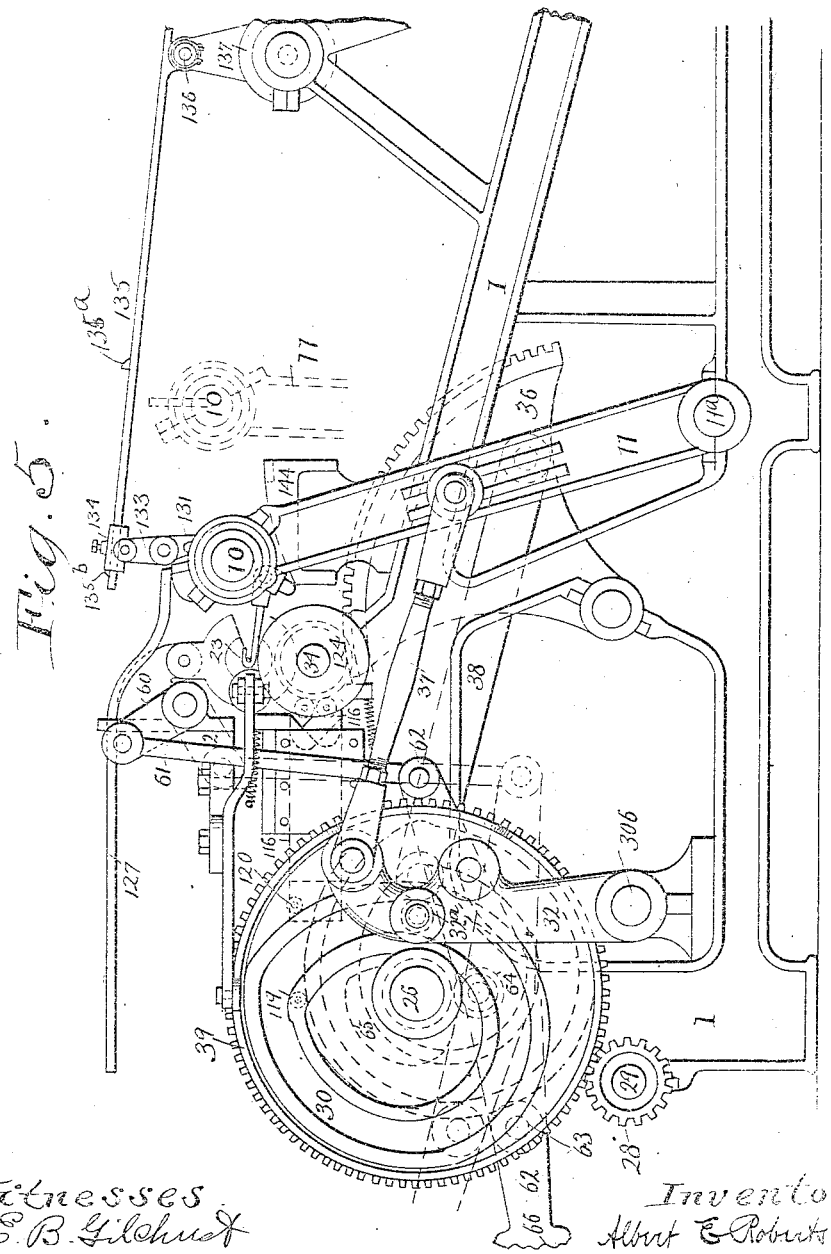

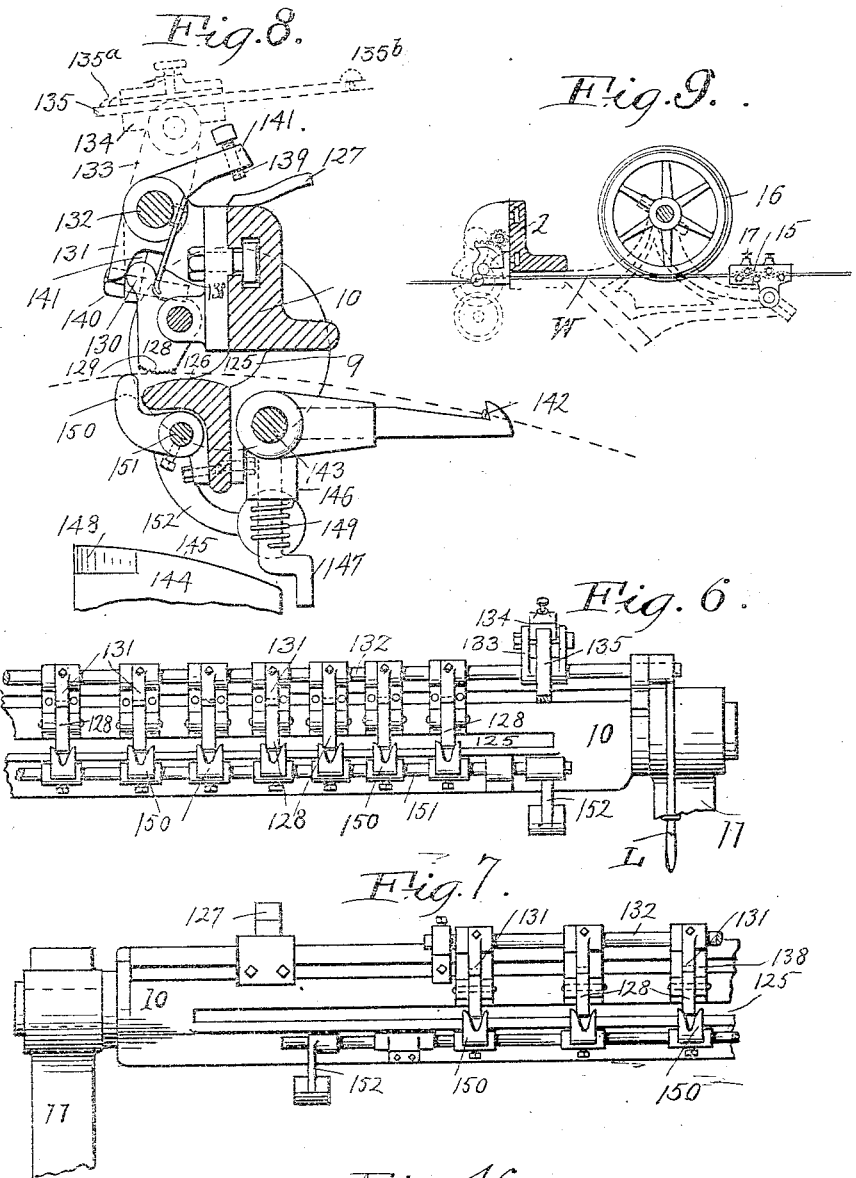

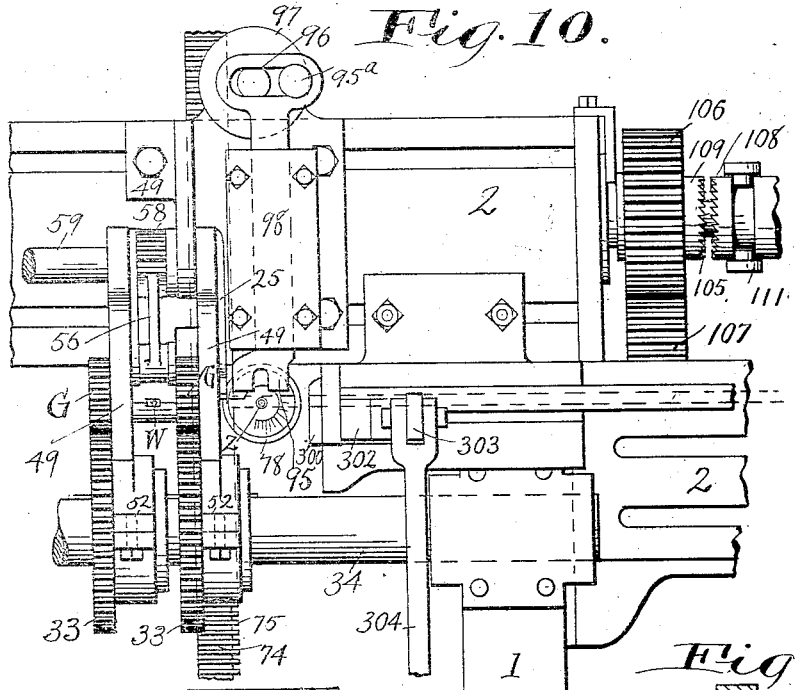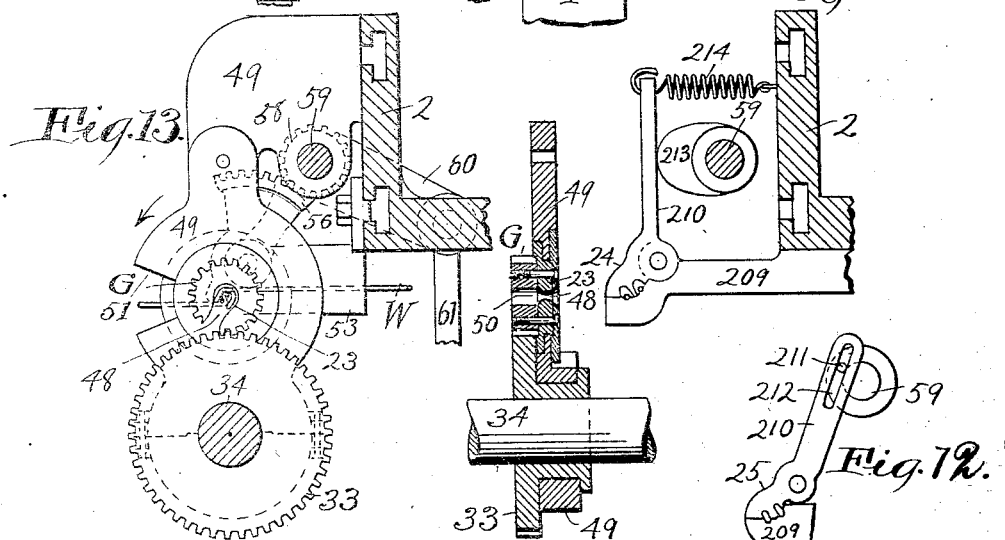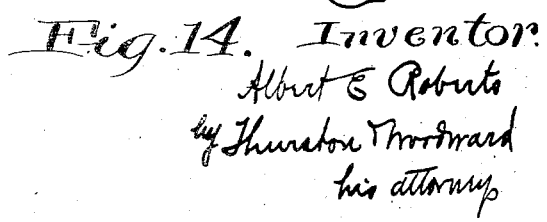

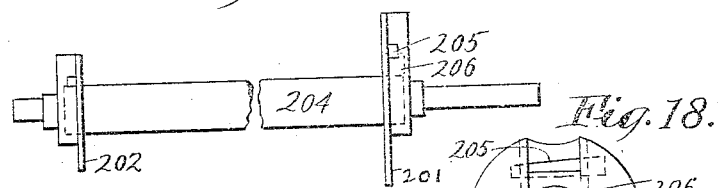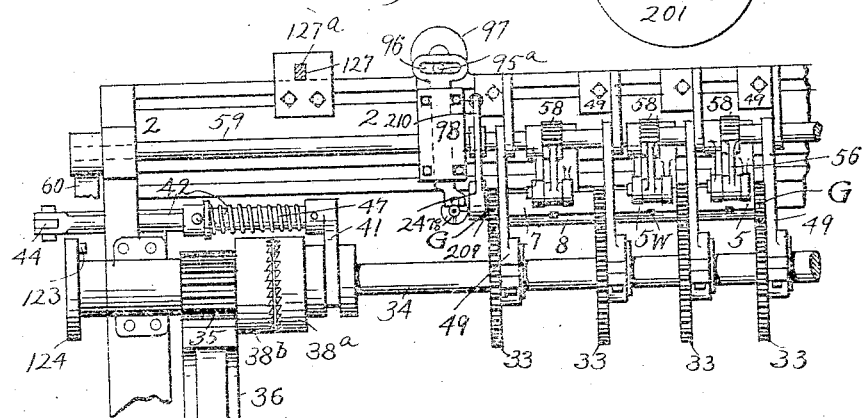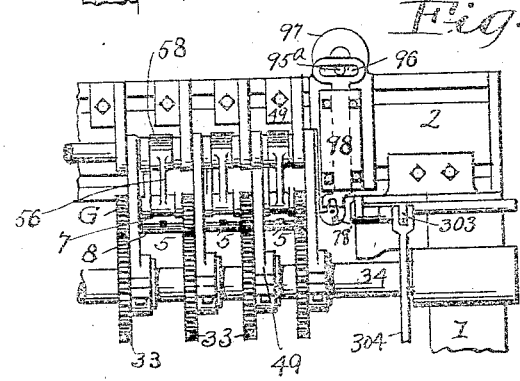

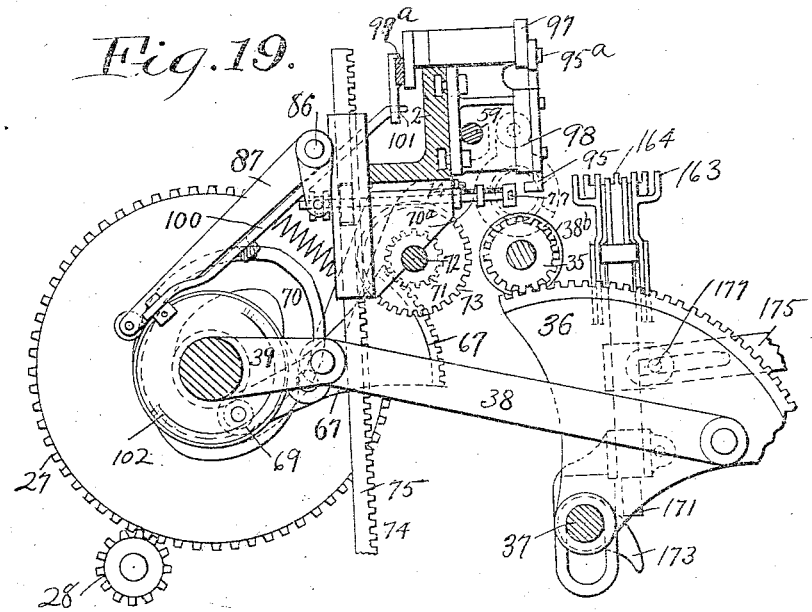
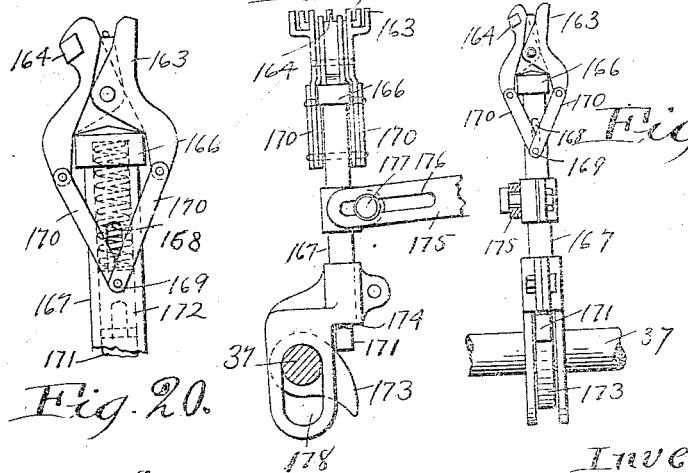

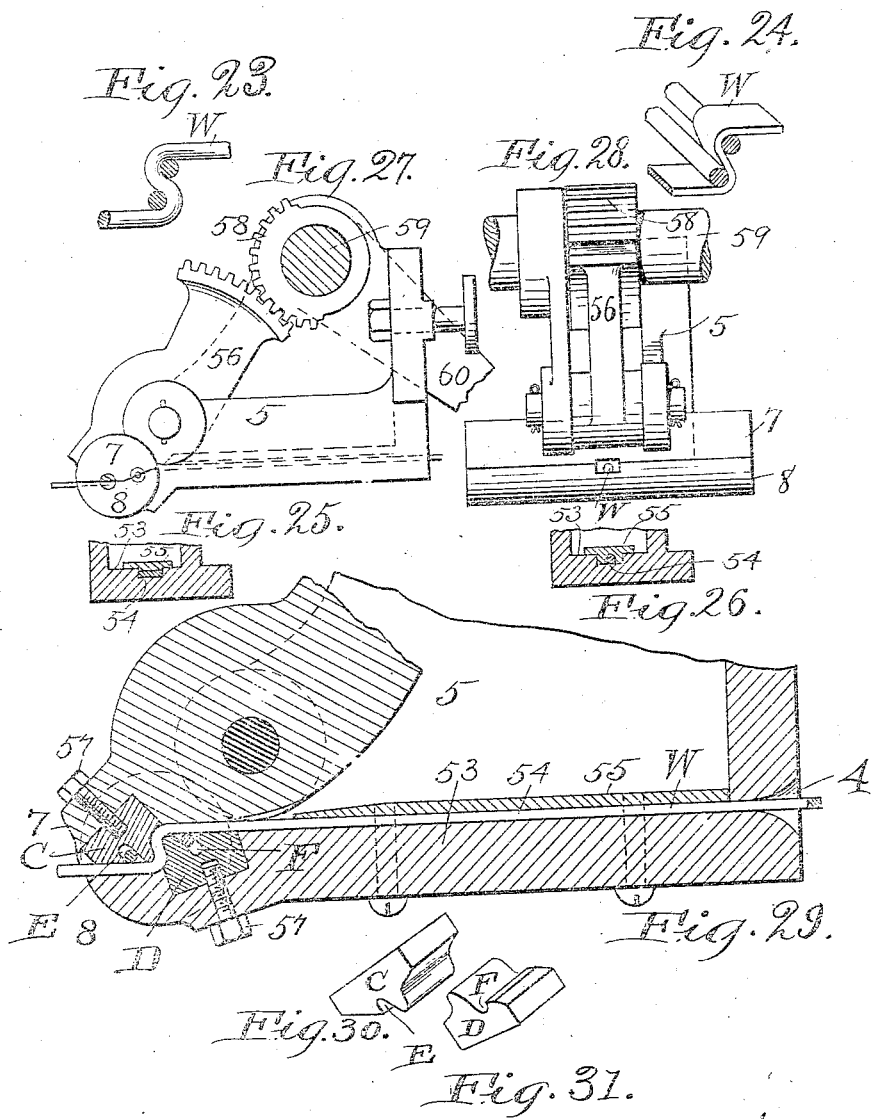

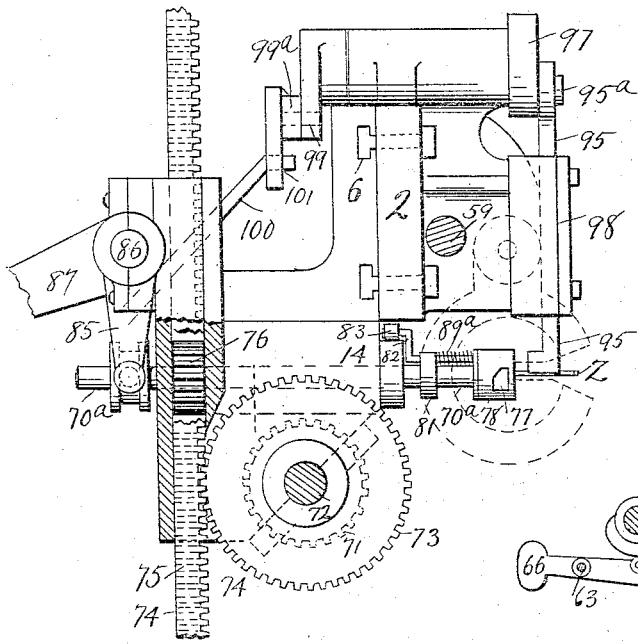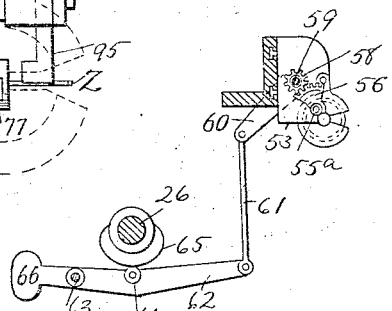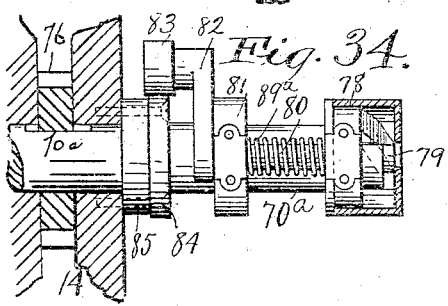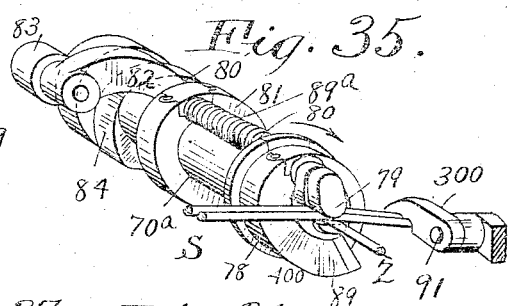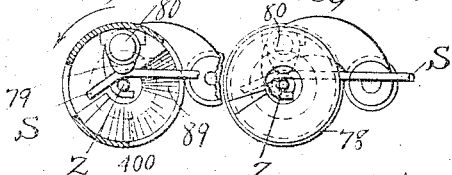

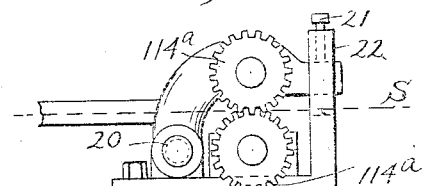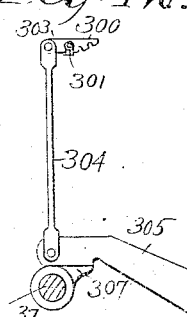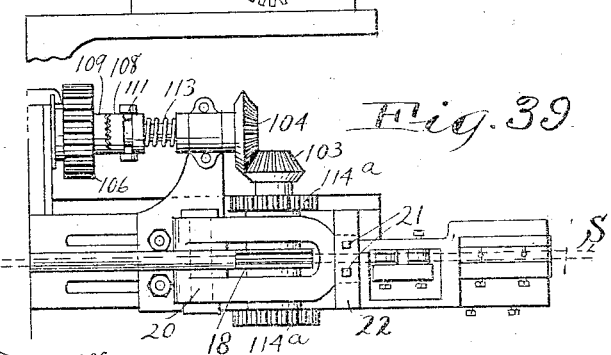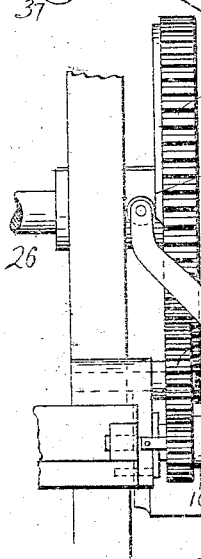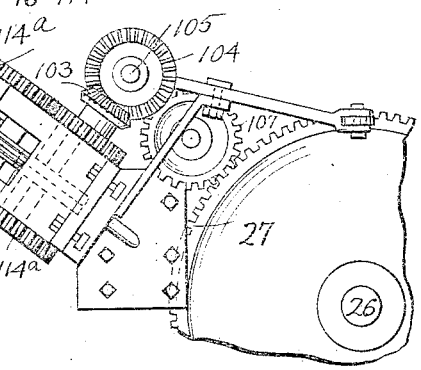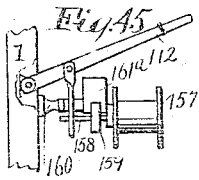

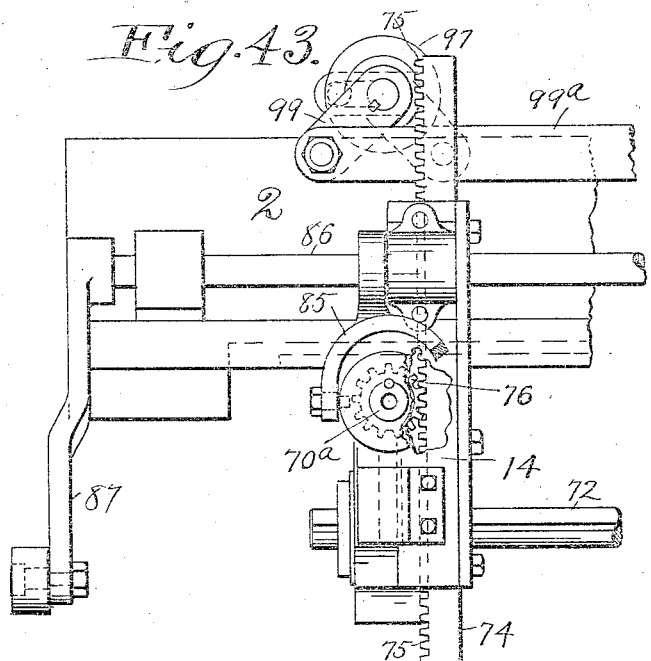
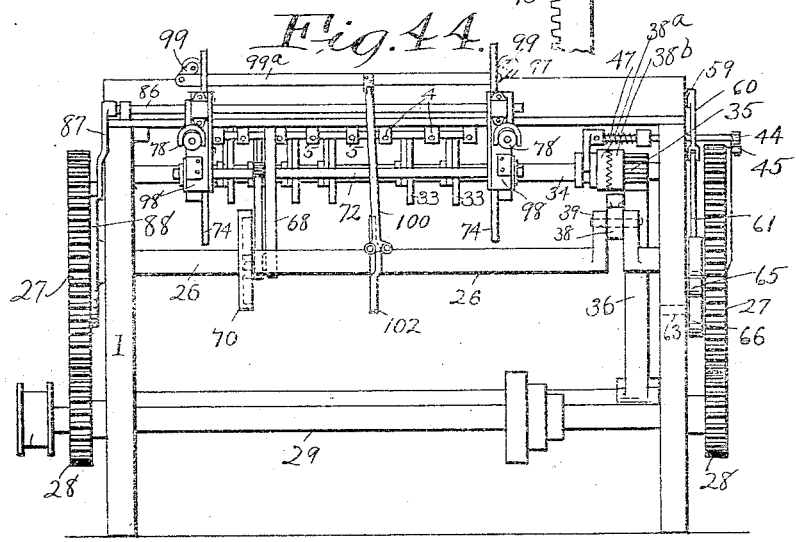

ALBERT E. ROBERTS, OF NORWALK, OHIO.

FENCE-MAKING MACHINE.

No. 907,887.   Specification of Letters Patent.   Patented Dec. 29, 1908.

Application filed June 7, 1905. Serial No. 264,139.

*To all whom it may concern:*

Be it known that I, ALBERT E. ROBERTS, a citizen of the United States, residing at Norwalk, in the county of Huron and State of Ohio, have invented a certain new and useful Improvement in Fence-Making Machines, of which the following is a full, clear, and exact description, reference being had to the accompanying drawings.

The object of the present invention, stated generally, is to so improve the machine shown in my prior patent No. 647,762, that it will operate more efficiently and will make a better fence.

The invention may be here summarized as the combination of parts, by which these results are secured, as shown in the drawings, and hereinafter described and claimed.

In the accompanying drawings, Figure 1 is a perspective view of the machine. Fig. 2 is a side elevation thereof. Fig. 3 is a detached side view of the device which throws the twisters back into position to release the stay wires when the twisting operation is completed. Fig. 4 is a plan view of the mechanism shown in Fig. 3. Fig. 5 is an enlarged side elevation of a portion of the opposite side of the machine to that shown in Fig. 2. Figs. 6 and 7 show in rear elevation respectively the right and left halves of the oscillating feed bar for the finished fence. Fig. 8 is an enlarged view in transverse section of the same. Fig. 9 is a side elevation in transverse section of the stationary bar 2 and one of the feed pulleys for the line wires. Fig. 10 is an enlarged front elevation of one end of the cross bar 2 and various associated parts, particularly the actuating devices for one of the stay winders and also for one of the line wire holders. Fig. 11 is a side view of the last guide for the stay wires. Fig. 12 is a side view of the first guide for the stay wires. Fig. 13 is a transverse section through the stationary bar 2 showing one of the twisters and bender guide in their relative positions. Fig. 14 is a central vertical section through one of the twisters and the actuating gear therefor. Figs 15 and 16 show respectively in rear elevation the two ends of the main stationary cross bar 2 of the machine and various wire guides, winders, twisters and wire bending devices associated therewith. Fig. 17 is a plan view of the reel and Fig. 18 is a sectional inside view of the said reel looking toward the larger head thereof. Fig. 19 is a longitudinal section of the front end of the machine taken through the main actuating shaft. Fig. 20 is an enlarged rear view of the crimping head. Fig. 21 is a side elevation of said crimping head and operating mechanism; and Fig. 22 is a rear elevation of the part shown in Fig. 21. Fig. 23 is a side view of one of the line wires after it has been crimped and a sectional view of the two stay wires as associated with it. Fig. 24 is a perspective view of the same parts when the so-called line wire is in the form of a flat band or tape. Figs. 25 and 26 show respectively transverse sections of bender guides designed for coöperation with a flat wire and a round wire respectively. Fig. 27 is a side elevation of one of the bender guides and its operating mechanism. Fig. 28 is a rear elevation of the parts shown in Fig. 27. Fig. 29 is a vertical central section of the bender guide taken in the plane which crosses the axis of the line wire showing the bender guides, the hardened steel blocks therein and means for adjusting said blocks. Figs. 30 and 31 are, respectively, views of the two hardened steel blocks in the upper and lower jaws of the bending guides. Fig. 32 is an enlarged transverse section showing in detail one of the winders and the mechanism associated therewith. Fig. 33 is a side elevation of a bender guide and the operating mechanism therefor. Fig. 34 is a plan view of the rear end of one of the twisters showing the clamping pawl which engages with the stay wire as it is being wound up on the line wire and the mechanism for actuating said pawl. Fig. 35 is a perspective view of the winder shown in Fig. 34. Fig. 36 is an end view of one of the winders. Fig. 37 is an end view of one of the winders with the end of the cap cut away. Fig. 38 is a side elevation of the feed device for the stay wires. Fig. 39 is a plan view thereof. Fig. 40 is an end view of the same. Fig. 41 is a plan view of the automatic clutch for controlling the movements of the stay wire feeding devices. Fig. 42 is a side elevation of the mechanism for cutting off the stay wires. Fig. 43 is an enlarged rear view of one end of the cross bar 2 and mechanism supported thereby. Fig. 44 is a front view of the machine. Fig. 45 is a rear view of the mechanism for raising and lowering the friction weight upon the driving belt of the reel; and Fig. 46 is a detail in the plane of the cam slide which releases the hand-actuated rod which raises the feeding hooks.

The frame consists essentially of two side frame members 1—1, a horizontal transverse bar 2 secured to the side frame members, and various transverse shafts hereinafter mentioned and tie rods 3, placed wherever necessary to tie the side members together and give the entire frame its required rigidity.

26 represents the main actuating shaft from which all of the other parts of the machine receive their motion. Secured to this shaft are two large gear wheels 27 which mesh with pinions 28 on the shaft 29 which is driven by any suitable outside power.

The oscillating feed bar 10 is attached to the upper ends of arms 11, whose lower ends are pivoted upon a transverse shaft 11ᵃ. Two substantially vertical arms 32 are pivoted at their lower ends upon a transverse shaft 306, and they carry rollers 32ᵃ which engage with cams 30 on gears 27, whereby said arms 32 are rocked forward and backward. Connecting rods 37 connect the arms 32 with arms 11, so that the latter are also rocked backward and forward. The connecting rods 37 are adjustable in length, and they may be connected with arms 11 at various distances from the pivots of said arms, so that the throw of the feed bar may be equal to the required distance between stays on the finished fence.

An oscillating gear segment 36 is pivoted to one of the side frame members 1, and it is given an oscillating movement by a crank 39 upon the main shaft 26, from which motion is transmitted to said segment by a connecting rod 38. The purpose of this segment is to operate the stay twisters. It engages with a pinion 35, loosely mounted upon the twister shaft 34. This pinion 35 is periodically connected to the shaft 34 by means of a clutch which includes a jaw 38ᵇ, secured to the pinion 35, and a jaw 38ᵃ on the end of a sleeve 40 which may slide upon, and which has a tongue and groove connection with shaft 34. This sleeve has a circumferential groove for the reception of the fork 41 on the end of a rod 42, which may slide back and forth in one of the side frame members. A spring 47 tends to move this rod in the direction to disconnect the clutch members; while said rod is moved in a contrary direction by means of a lever 44 carrying on its end a friction roller 45, which engages with a cam-shaped surface 39, on the gear wheel 27.

Adjustably secured to the shaft 34 are a plurality of gears 33 meshing with the geared parts of the twisters 48. These twisters are shaped substantially like those shown in my said prior patent; and each has, in addition to the geared part, a cylindrical part on which it turns; and a slot is formed in each one, extending from end to end, and radially inward from the periphery to a point beyond the center,—this slot being only a very little wider than the diameter of the stay wires. Each twister is rotatably mounted in a slotted bracket 49. These brackets are adjustably secured to, and project below, the rear face of the transverse bar 2. Guide blocks 5 are also secured to the rear side of bar 2, and one of them is located between each adjacent pair of twisters,—their width being substantially equal to the distance between said twisters. Each guide block has a hole 4 through its front wall, and a rearwardly extended platform 53, in which is a groove 54, to receive and guide the line wire W which is threaded through the hole 4. A cap plate 55 is secured over said groove, to hold the wire therein. Perhaps it might be more correct to say that the groove 54 is between the platform 53 and cap 55, because it may be in the former as shown in Fig. 25, or in the latter as shown in Fig. 29.

The rear edge of each guide 5 forms the fixed jaw 8 of a pair,—the vertically movable jaw 7 being the lower end of a lever 56 which is pivoted on a horizontal axis to block 5. These jaws serve two important functions. First they are the means whereby to give the line wires of the fence a sharp and approximately right angle crimp or bend at the point where the stay wires are to embrace the line wires (see Figs. 29, 23, and 24). These crimps are very important characteristics of the fence, since they prevent the slipping of the stays, and they also allow the crimped line wires when the fence is erected, to expand and contract under the influence of varying temperatures, without damage. Second, the engaging faces of these jaws contain respectively the horizontal grooves E and F (see Fig. 29) in which the stay wires are guided across the machine, passing one above and one below the line wires. These grooves are alined with the slots in the twisters so that the stay wires are thereby guided through said twisters. These grooves E and F are formed in the proximate faces of hardened steel blocks C and D which are let into the face of the two jaws 7 and 8 wherein they are held by set screws 57. Each of these levers 56, which carry the movable jaws has a segment gear on its upper end; and these segment gears mesh with segment gears 58, secured upon a rock shaft 59 mounted on the bar 2. This rock shaft has an arm 60 attached to it at one side of the machine. A connecting rod 61 is pivoted to the end of this rock arm, and the lower end of the connecting rod is connected to a lever 62 which is pivoted at 63 to one of the side members and is provided with a roller 64 which engages with the cam 65 on the inner face of the adjacent gear 27. The front end of the lever 62 is formed with the weight 66 which operates to move the lever in that direction, which through the described mechanism, will cause the movable jaws to open, while the cam referred to moves this lever in the opposite direction, and causes the jaws to close and thereby to crimp the line wires as stated. All of the line wires pass through wire straighteners 15 of familiar form, and then around grooved sheaves 16 secured upon a single shaft,—the purpose of these sheaves being to insure the feeding of an equal length of each wire into the machine. The straighteners which are provided with a set screw 17 supply the necessary tension to cause the wires to hug these sheaves closely. The two outside line wires are passed respectively through two winders 70ª; and the intermediate line wires are threaded through the openings 4 in the blocks 5 and then through the groove 53 and between the jaws 7 and 8. All of the wires then pass through slot 125 in the feed bar 10, and thence to the reel 12 upon which the finished fence will be wound.

Two stay wires S are fed across the machine periodically in the grooves E and F by two pairs of groove feed rollers 18 and 19 which are tipped at such an angle as will enable them to deliver the wires into said grooves. The upper feed rollers are both mounted in a swinging frame 20 pivoted to the base in which the lower rolls are journaled; and the base is fixed to a suitable support projecting laterally from one of the side members. The position of this swinging frame and consequently the position of the upper rollers with respect to the lower rollers is determined by a set screw 21 which screws down through a yoke rigid with the base against a part of said swinging frame. The feed rollers have attached to their shafts the intermeshing pinions 114ª. This stay wire feeding mechanism is operated periodically by the following mechanism, (see Figs. 39, 40, and 41). A beveled gear 103 attached to the shaft of one of said feed rollers 19 meshes with a beveled gear 104 attached to a shaft 105 mounted in a bearing 114. A pinion 106 is rotatively mounted upon this shaft. This pinion is driven by the gear 27 through the intermediate pinion 107. A clutch is provided for connecting pinion 106 with shaft 105. This is an ordinary jaw clutch, one part 109 of which is on pinion 106, while the other part 108 is the end of a sleeve having a tongue and groove sliding connection with shaft 105. A fork lever 111 engages in the circumferential groove in this sleeve 108, while the other end of the lever engages with a cam 112 on the inner face of the adjacent gear 27. A spring 113 acts to move sleeve 108 in the direction to cause the clutch jaws to engage. It will be understood that when these stay wires are fed across the machine, the jaws 7 are closed and the intermediate line wires have been crimped thereby as described. It will be further understood that these stay wires pass through the twisters and also pass into the embrace of the winders. The winders are tubular, and are rotatably mounted in brackets 14 which are adjustably secured to cross bar 2. A rack bar 75 is associated with each winder,—and this rack bar is vertically movable in a deep vertical groove in said bracket. This rack bar has two sets of teeth, one of which engages with a pinion 76 which lies in the same groove, being thereby prevented from moving axially, and which surrounds the winder and has a tongue and groove connection therewith. The other set of rack teeth are engaged by a pinion 73 attached to a shaft 72 whereon is secured a pinion 71. This pinion is engaged by gear teeth on the end of a lever 67 (see Fig. 19) which is pivoted to an extension of bracket 14 and carries on one end a friction roller 69 which engages with a cam 70 on the shaft 26.

The stay wires pass over each of the outside line wires and between it and a pawl 79 carried by the winder at the end thereof. This pawl is secured to a short rock shaft 80 whose axis is parallel to the axis of the winder, and which is mounted in the head of the winder and a flange 81 secured to the winder. Secured to this shaft 80 is an arm 82 carrying a friction roller 83 on its end. This friction roller normally lies in contact with the surface of a fixed cam 84 which lies adjacent to a fixed cylindrical boss 85. This cam in some parts of its periphery is of the same diameter as this boss. A spring 89ª acts to turn shaft 80 in that direction which turns up the pawl 79, and which holds the friction roller 83 against the cam 84. Each of these winders has an endwise movement as well as a rotary movement. To produce this movement a fork lever 85 engages with a grooved collar secured to the winder tube. This arm 85 is attached to a rock shaft 86 to which is also attached a lever 87 whose outer end bears against a cam 88 on one of the gears 27,—a spring being provided to hold it in such engagement. As the winder is turned, roller 83 rides up the cam 84 and thereby rocks the rock shaft 80 so as to cause the pawl 79 to bear upon the stay wires. When this roller 83 has reached the highest part of cam 84, the winder has been moved forward, (that is to say toward the left as shown in Fig. 32) and this movement causes a like movement of the roller 83 which carries said roller over onto the cylindrical boss 85. The winder may now rotate several times until the cut off ends of the stay wires are wound upon the outside line wires. This endwise movement of the twister has an effect of causing the stay wires to wind spirally upon the line wire to make a good looking coil. Before the winder has ceased its rotation in the direction referred to, the pawl 79 has passed out of engagement with the stay wires. It is at this time that the feed bar 10 draws the finished fence along out of the range of said winder; and thereafter the winder turns in the other direction as the described parts return to their first position.

Just before the winders commence to move the cutter 300 is operated to sever the stay wires, and it consists of a pivoted blade, secured to a rock shaft 301, which is provided with an arm 303. This in turn is secured to one end of a rod 304, the other end of which is attached to one end of a rock arm 305, mounted loosely upon the rock shaft 306. A cam 307 upon the shaft 37 serves to raise and lower this arm and operate the cutter so that its movements shall be timed to cut the stay wires at the proper time.

It will readily be seen that the twisting of the stay wires tends to shorten them, and hence if the stay wires were first wound upon the outside wires of the fence, the outside wires would be pulled together and bent out of shape by the twisting, hence the movements of the parts are so timed as to first open the wire bending jaws 7, then operate the twisters and nearly complete the stay, and then to operate the winders and coil the wire about the outside wires. To further insure that said outside wires will remain straight, the vertically movable fork bars 95 are provided which when moved down, embrace the two outside wires. These fork bars are mounted in brackets 98, which are secured to bar 2. In the upper ends of the bars 95 are horizontal slots 96. Into each of these slots projects a crank pin 95ª on disk 97 attached to a rock shaft mounted in said bracket 98. Crank arms 99 secured to the other end of these shafts are connected by a bar 99ª. An arm attached to said bar has a hole which receives the bent end 101 of a lever 100 which is pivoted to a fixed support and engages with a cam 102 upon the main shaft. The fork bars 95 are moved down over the line wire once during every revolution of the main actuating shaft and are maintained in their position locking the wires during the entire duration of the twisting and winding movements, when they must be raised to permit of withdrawing the fence by means of the mechanism provided for that purpose.

The parts described operate in a natural sequence as follows: After the jaws 7 have been closed down upon the line wire and the bends are formed therein, the stay wire feeding mechanism is started into action by means of the automatic clutch mechanism shown in Fig. 32. As soon as the stay wires are fed to the machine through guides, which lead them above the outside line wires to the winders, and respectively above and below the intermediate wires, one on each side of the angular bends therein, the stay wire feed is automatically stopped. The holding forks 95 have by this time descended upon the outside line wires, and hold them rigidly in place. The jaws 7 then open, and the twisters located between the bends in the line wires commence to rotate. These twisters make two revolutions, and when they have finished their work, the slots therein have been carried somewhat past the slots in the twister brackets as shown in Fig. 13 in which position it would not be possible for the stays to be withdrawn therefrom. It is necessary for this reason that a slight reverse movement should be given the twisters so that the slots therein shall register with the slots in the supporting brackets, whereby the stays can be pulled out from them. This untwisting movement is given to the twisters to allow for the natural tendency of the stays to untwist a little, and so that the twisters will be in a position to release them when the natural untwisting process is completed. If not permitted to untwist, the stay wires would bind in the twisters. Means are therefore required to turn the twisters back slightly to permit the withdrawal of the stay wires, and to immediately turn back the twisters to the diagonal position in which they must be placed to receive the stay wires when they are fed across the machine. This is accomplished by means of the crank pin 123 set in the disk 124 upon the outer end of the twister shaft, upon the side of the frame. Between the end of the twister shaft and the adjacent gear 27 are the sliding plates or bars 115 and 116, whose vertical edges 117 and 118 are adapted to be engaged by pins 119 and 120 set in the inner side of the adjacent gear 27, and with reversely inclined edges 121 and 122 adapted to engage the pin 123 on the disk 124, one after the other, and throw it first in one direction and then in the other. Springs serve to withdraw the bars instantly as soon as they are released by the pins upon the gear 27. The winding of the ends of the stay wires upon the outside line wires has been accomplished before this, and holding forks 95 have also been raised, and all is now in readiness to withdraw the fence the required distance between two stays so that another stay can be attached to the line wires. This is accomplished by the reciprocating feed bar 10 and the parts carried thereby. This feed bar is secured at its ends by horizontal pivots to the upper ends of the bars 11 and has a limited rocking motion on said pivots. A rod 127, secured to the feed bar, passes through an opening in a plate 127ª, secured to the stationary bar 2, has the effect of rotating the feed bar about its pivots sufficiently to offset its angular divergence from the horizontal due to the swinging movements of the arms 11,—and this maintains the lower edge 126 of slot 125 in a substantially horizontal position at all times. Pivoted upon the rear face of this feed bar are seen a plurality of pawls 128 adapted to compress the line wires upon the edge of the platform 126 of the feed bar, one pawl for each wire. Their engaging extremities 129 are shown slightly serrated to give better holding power. These pawls are provided with rounded upper extremities 130 which are engaged by forks 131 secured to the rock shaft 132 which is mounted longitudinally upon the feed bar.

At one extremity of this shaft are secured the arms 133 upon the upper end of which is pivoted a guide or box 134 for the rod 135, which slides therein, and is secured at its rear extremity to the pin 136 which is rigidly attached to the extension 137 of one of the side frame members 1. This bar is provided with two shoulders 135$^a$ and 135$^b$ (see Fig. 8), which respectively engage with the box 134, when the feed bar is at opposite ends of its path of travel. The effect is to swing the rock shaft 132 and forks thereon so as to force the gripping pawls into contact with the line wires as the feed bar reaches its forward position, and to release them as the feed bar reaches its rearward position. The pressure of the pawls 128 upon the wires is first obtained by means of the inner side of each fork 131, which is shown as a spring 138, sufficiently strong to give firm contact but not strong enough to wedge the pawl if the movement of the fork should be too great. Stop screws 139 and 140 may be employed upon arms 141 upon the rock shaft, to limit the movement of the forks. The moment that the wire is caught, however, under the pawls it is automatically held thereby until released. As soon as the rearward movement of the feed bar ceases the rock shaft 132 is turned back and the forks release the pawls from the wires. To insure further perfect regularity in the feed of all parts of the fence, hooks 142 pivoted upon the lower portion of the feed bar and secured to a common rock shaft 143 rise as the bar moves in the feeding direction and engages the stay wires from beneath, and continues to pull upon them until the feed bar stops and begins its rearward motion, when the hooks fall by gravity to their former position beneath the level of the stay wires.

The hooks are raised by means of a simple expedient, viz. A plate 144 upon the side bar 1 (one either side of the machine, or one plate alone,) is provided with a curved edge 145, substantially the arc of a circle described from the pivotal point of the swinging arms 11. In a boss 146 upon the rock shaft 143 is a socket for a substantially vertical rock shaft 147 having a crank arm on its lower end which engages this edge during the feeding movement of the feed bar, and tips up the shaft 143 and arms thereon until said hooks engage the stay wires. This crank arm passes beyond plate 144 during the feeding movement, wherefore when the feed bar begins its return movement the hooks drop down through the action of gravity, as before stated. There is an inclined surface 148 on one side of the plate 144 which engages said crank arm and swings it to the side of plate 144 so that said plate will not swing the shaft to carry the hooks upward. A spring 149 returns the said shaft 147 to the position when it will engage with edge of the plate 144, when the feed bar again swings in the feeding direction. Forks 150 mounted adjustably upon a shaft 151 mounted on the feed bar, below its axis, serve to aline the wires and maintain them in a proper position for the pawls to seize them. When the stay wires pass over them they turn backward, and weighted arms 152 secured to the rock shaft 151 restore them to their normal position as soon as the stay wires have passed.

The two outside line wires are crimped to give them the required elasticity, and to make them compare in length with the intermediate wires which are shortened by being bent between the jaws 7—8, by means of the following crimping mechanism of which one is located on each side of the machine, and normally below the adjacent outside line wire.

A vertical tubular support 167 has a yoke 178 on its lower end. This yoke has a vertical slot 178 through which the shaft 37 passes,—and the entire crimping device is supported on said shaft. Two crimping jaw levers 163, 164, are pivoted to the upper end of this support and are provided with crimping fingers so placed that when the jaws are closed they may pass each other. The lower ends of these levers are pivoted to links 170, whose lower ends are united by a pivot pin 169. This pivot pin passes through slots 168 in the support and through a block 172 which slides therein. A spring within the support above that block tends to push it downward and thereby to open said crimping jaws. A sliding rod 171 is also in said tubular support, its upper end being screwed into said block, and its lower end projecting below the support. A swinging arm 175 pivoted to one of the side frame members, is also pivoted to the support 167, thereby holding the crimping device in a substantially erect position. While the stay wires are being twisted, a cam 173 on shaft 37 engages with the lower end of rod 171, and lifts the entire crimping device until the two crimping jaws are on opposite sides of the line wire. At this time the lower end of slot 178 has engaged with shaft 37, making it impossible to move the crimping device up any further. The cam 173 thereafter moves rod 171 up in support 167, thereby through the described mechanism closing the crimping jaws to crimp the wires. When the cam 173 permits, the parts reverse the described motions.

The completed fence after passing over a guide roller 200 is wound upon the reel, which is constructed as follows: 201 and 202 are flanged heads which are provided with short shafts mounted upon the side frame in suitable bearings. In the larger head 201 is a circular recess formed in part by a removable block 206 which is removable radially through a slot in the face of the disk. This removable piece is held in place by a wedge 205, which, when removed, permits the removal of block 206. In the face of the head 202 is a circular recess, and across this recess as well as across the recess formed in part by the block 206, is a diametrical rib 207. These circular recesses are for the reception of the ends of reel roll 204 which is made of two longitudinal separable halves. When the ends of this roll are in the recesses of the two heads, the ribs 207 lie between these two halves and keep them separated. When a sufficient quantity of fence has been wound upon the central roll 204 between the heads 201 and 202, it may be removed by first removing the wedge 205 and then removing the block 206. The end of the roll 204, which is in that particular recess, may be then removed, and in being removed, will withdraw the other end from the head in the recess 202. When the roller is withdrawn from these heads, the ribs 207 of course are withdrawn from between the two halves of the roll whereupon said roll collapses in diameter and the two halves thereof may readily be withdrawn from the reel of fence.

A most efficient adjunct to the fence feeding device is found in the friction device which regulates the power of the friction belt, which drives the reel, as seen in Figs. 1 and 2, and in detail in Fig. 45.

153 is the belt which passes over the pulleys 154 and 155, one on the main shaft and the other on the reel shaft 156. An idler 157 which rests upon the belt is mounted upon a pin 158, on the outer end of an arm 159, which in turn is sleeved over the wrist 160 secured to the side frame.

To make the idler more easily manipulated, a lever 162 is pivoted upon the frame and connected with the pulley pin, by means of which the pulley can be forced down upon the belt, or raised to relieve it from friction as desired, the nut 161 holding it wherever placed. The utility of this device is as follows: The movement of the fence by the feed bar and its adjuncts enables the described mechanism to easily rotate the reel, whereby the completed fence is wound upon the reel as fast as it is moved along by said feed bar.

Having described my invention, I claim:

1. In a machine for making wire fence, the combination of a plurality of pairs of wire bending jaws between which the line wires severally pass,—said jaws being arranged in a row crosswise of the machine, and each pair of jaws comprising a fixed jaw having in its face a transverse groove for guiding a stay-wire, and a movable upper jaw having in its face a transverse groove for guiding a stay-wire, and mechanism for opening and closing said jaws.

2. In a machine for making wire fence, the combination of a plurality of rotatable stay twisters and a plurality of pairs of wire bending jaws which are severally placed in the spaces between said twisters,— the fixed jaw of each pair having across its face, a horizontal stay-wire guiding groove, and the movable jaw having across its face a horizontal stay-wire guiding groove, and means for opening and closing the movable jaws.

3. In a machine for making wire fence, the combination of a row of wire bending jaws, comprising a fixed jaw and a pivoted jaw, each of which latter jaws has an arm with gear segments on its outer edge, and a rock shaft having attached to it geared segments which severally mesh with the gear segments on said arms.

4. In a machine for making wire fence, the combination of a row of wire bending jaws comprising a fixed jaw and a pivoted jaw, with a rock shaft, mechanism through which the movement of said rock shaft opens and closes all of said jaws, a crank arm secured to said rock shaft, a pivoted lever having a weighted end, a link connecting the other end of said lever with said crank arm, and a rotating cam for actuating said lever.

5. In a machine for making wire fence, the combination of a fixed transverse bar forming a part of the machine frame, slotted brackets adjustably secured thereto, and slotted stay twisters rotatably mounted in said brackets, with a plurality of blocks adjustably secured to said transverse bar, and each having a guide hole through its front end for the passage of one of the line wires of the fence, and having its rear end shaped to form a wire bending jaw, and levers severally pivoted to said blocks and having their lower ends shaped to form a wire bending jaw, and means for acting upon the other arms of said levers to simultaneously rock the levers to open and close all of said jaws.

6. In a machine for making wire fence, the combination of a fixed block having a guide hole and groove for a line wire and having its rear end shaped to form a bending jaw and having an adjustable hardened block set into and forming a part of said jaw, with a movable jaw having an adjustable hardened block set into the same in opposition to the block in the fixed jaw, and mechanism for opening and closing said movable jaw.

7. In a machine for making wire fence, the combination of a block 5 having a hole through its front wall and having a rearwardly extended platform and a cover plate over the same,—there being between said platform and plate a guide groove in line with the opening through the front part of said block, and said platform having its rear end shaped to form a bending jaw, with a lever pivoted to said block, and having its lower end shaped to form a coöperating bending jaw, and having, on its upper end, a gear segment, and a rock shaft mounted in said block and having a gear segment attached to it in mesh with the other gear segment mentioned.

8. In a machine for making wire fence, the combination of a movable support arranged in juxtaposition to the outside line wire of the fence which the machine is making, crimping jaws carried by said support, mechanism for moving said support to cause said jaws to embrace said line wire, and mechanism for closing said jaws to crimp said line wires.

9. In a machine for making wire fence, the combination of a tubular support and yoke piece to which the same is secured,—which yoke piece is provided with a vertical slot, a pair of crimping jaws pivoted to the upper end of said support, a piece movable in said tubular support, links pivotally connected thereto and to said jaws, a spring acting to move said piece in the direction which will cause the opening of said jaws, a rod in said support, engaging with said piece and projecting below said support, a rotatable shaft passing through the slot of said yoke, a cam secured thereto for engaging with the projecting end of said rod, and means for holding said support in a substantially erect position.

10. In a machine for making wire fence, the combination of a tubular winder through which an outside line wire is threaded, said winder being rotatably mounted in a fixed support, a pawl movably secured to the end of said winder for engagement with stay-wires which have been passed between it and said line wire, means for moving said pawl to engage with said stay-wires, mechanism for rotating said winder, and mechanism for moving the winder endwise while it is in rotation.

11. In a machine for making wire fence, the combination of a rotatable tubular winder, a rock shaft mounted thereon on an axis parallel with the winder, a pawl secured to said rock shaft, a crank arm also secured to the rock shaft, fixed cam and adjacent boss with which the said crank arm may engage, and means for rotating said winder and for moving it endwise at the same time.

12. In a machine for making wire fence, the combination of a tubular winder rotatably mounted in a stationary part of the machine frame, a rack bar movable vertically in a suitable guide groove, a pinion lying in said guide groove surrounding said winder and having a tongue and groove connection with the latter, mechanism for moving said rack bar up and down, and means for moving said winder endwise while it is in rotation.

13. In a machine for making wire fence, the combination of a tubular winder rotatably mounted in a stationary part of the machine frame, a rack bar movable vertically in a suitable guide groove and having rack teeth on two sides, a pinion lying in said guide groove surrounding the winder and having a tongue and groove connection therewith and being in mesh with one set of rack teeth upon said bar, a driving pinion in mesh with the other set of rack teeth, means for turning the latter pinion first in one direction and then in the other, and mechanism for moving the winder endwise in its bearings while it is in rotation.

14. In a machine for making wire fence, the combination of a plurality of slotted brackets, slotted stay twisters rotatably mounted in said brackets, means for rotating said twisters and for causing the said rotation to cease at a time when the slots in the twisters are out of line with the slots in the brackets, other means for turning said twisters backward to bring their slots into line with the slots in the brackets, and still other means for subsequently turning said twisters forward to carry their slots out of line with the slots in said brackets.

15. In a machine for making wire fence, the combination of a plurality of slotted brackets, slotted stay twisters rotatably mounted in said brackets and having each a geared portion, rotatable shaft carrying a plurality of gears which respectively mesh with the geared part of said twisters, means for connecting and disconnecting said shaft periodically from the mechanism for turning it, a disk secured to said shaft and carrying a crank pin, a slide having a beveled end for engaging with said crank pin, a spring for moving said slide endwise out of the range of said crank pin, and mechanism operating against said slide to move it in the contrary direction and into engagement with said crank pin, substantially as and for the purpose specified.

16. In a machine for making wire fence, the combination of a plurality of slotted brackets, slotted stay twisters rotatably mounted in said brackets and having each a geared portion, a shaft carrying a plurality of gears which respectively mesh with the geared part of said twisters, means for connecting and disconnecting said shaft periodically from the mechanism for turning it, a disk secured to said shaft having a crank pin, two slides having oppositely beveled adjacent ends adapted for engagement with said crank pin, springs for moving said slides to carry their beveled ends out of the range of said crank pin, and means for independently moving said slides at different times in the opposite direction.

17. In a machine for making wire fence, the combination with means for winding the ends of stay-wires onto the outside line wires of the fence under construction of vertically movable bars having forks upon their lower ends for engagement with said line wires and having substantially horizontal slots in their upper ends, two shafts having crank pins which respectively enter said slots and having at their other ends crank arms, a bar connecting the crank arms last referred to, a lever engaging said bar to move it endwise, and a cam for operating said lever.

18. In a machine for making wire fence, the combination of a transverse horizontal feed bar having a slot extending across the same, means for reciprocating said feed bar longitudinally (in respect to the machine), a plurality of hooks, a rock shaft mounted upon said feed bar to which they are attached, an arm depending from said rock shaft and having a socket, a shaft inserted in said socket and having a crank arm on its lower end, a spring to return said shaft to an operative position, and a fixed piece 144 having an inclined top surface and a beveled side surface with which the crank arm engages as the feed bar is reciprocated.

19. In a machine for making wire fence, the combination of the reciprocated feed bar 10 having the slot 125, a plurality of cam levers pivoted to said feed arm above the slot therein and having upwardly extended arms, a rock shaft mounted upon said feed bar, having a plurality of fork arms engaging with the upper ends of said cam levers, and means for rocking said rock shaft in one direction when the feed bar is at one end of its path and in the other direction when the said bar is at the other end of its path.

20. In a machine for making wire fence, the combination of the reciprocating feed bar 10 having a slot 11 whose lower wall forms a clamping platform, a series of pawls pivoted to said bar above said platform, which pawls have upwardly extended arms, a rock shaft pivoted to said bar, and having secured to it a plurality of forked arms which embrace the upper ends of said pawl arms, one side of each fork into which a pawl arm projects being a spring.

21. In a machine for making wire fence, the combination of the reciprocating feed bar 10 having a horizontal slot through it, whose lower wall forms a clamping platform, a plurality of pawls pivoted to the bar above said slot, mechanism for simultaneously operating said pawls, and a plurality of forked guides 150 pivoted to the bar below said slot, and weighted arms for moving said guide bars into operative position.

22. In a wire fence making machine, a collapsible reel consisting of independent flanged heads provided each with a short supporting shaft, one of said heads being radially slotted and the other provided with semi-circular sockets, a longitudinally divided shaft connecting said heads and inserted in the slot in one head, and in the sockets in the other head, and a retaining wedge and bearing inserted in the slotted head, substantially as described.

23. In a fence making machine, in combination with a periodically reciprocating fence feeding device, of a reel on which the fence is wound, a pulley secured to said reel, a driven shaft, a pulley thereon, a belt running over said pulleys, a friction device adapted to hold the reel still while the fence feeding device returns empty, consisting of an idler engaging the belt, a swinging arm adjustably secured to the machine frame and carrying a pin on which said idler is mounted, a weight on said arm, a lever pivoted to the machine frame, and a link connecting said lever and arm, substantially as described.

In testimony whereof, I hereunto affix my signature in the presence of two witnesses.

ALBERT E. ROBERTS.

Witnesses:
E. B. GILCHRIST,
E. L. THURSTON.